(12) United States Patent
Park

(10) Patent No.: US 9,496,529 B2
(45) Date of Patent: Nov. 15, 2016

(54) SECONDARY BATTERY

(71) Applicant: Samsung SDI Co., Ltd., Yongin-si, Gyeonggi-do (KR)

(72) Inventor: Wan-Woo Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 599 days.

(21) Appl. No.: 13/655,601

(22) Filed: Oct. 19, 2012

(65) Prior Publication Data

US 2013/0149599 A1 Jun. 13, 2013

(30) Foreign Application Priority Data

Dec. 9, 2011 (KR) ........................ 10-2011-0132082

(51) Int. Cl.
*H01M 2/02* (2006.01)
*H01M 2/06* (2006.01)

(52) U.S. Cl.
CPC ............... *H01M 2/021* (2013.01); *H01M 2/06* (2013.01); *H01M 2/026* (2013.01); *H01M 2/0277* (2013.01); *H01M 2/0285* (2013.01); *H01M 2/0287* (2013.01)

(58) Field of Classification Search
None
See application file for complete search history.

(56) References Cited

U.S. PATENT DOCUMENTS

| 6,451,476 | B1 | 9/2002 | Chang et al. | |
|---|---|---|---|---|
| 2005/0084749 | A1 | 4/2005 | Hwang et al. | |
| 2006/0127756 | A1* | 6/2006 | Seo | 429/175 |
| 2007/0154794 | A1 | 7/2007 | Kim et al. | |
| 2008/0311469 | A1 | 12/2008 | Kim | |
| 2009/0258290 | A1 | 10/2009 | Lee et al. | |
| 2010/0310930 | A1 | 12/2010 | Park et al. | |
| 2011/0117394 | A1 | 5/2011 | Hwang et al. | |
| 2011/0183181 | A1 | 7/2011 | Moon et al. | |

FOREIGN PATENT DOCUMENTS

| CN | 1610166 A | 4/2005 |
|---|---|---|
| CN | 1783570 A | 6/2006 |
| CN | 102136564 A | 7/2011 |
| KR | 10-2005-0036466 A | 4/2005 |
| KR | 10-2005-0066120 A | 6/2005 |
| KR | 10-0918408 B1 | 9/2009 |

OTHER PUBLICATIONS

Chinese Office Action issued from the Chinese Patent Office on Dec. 29, 2015 with respect to Chinese Patent application No. 201210477189.4 filed on Nov. 21, 2012.
Office Action issued by the State Intellectual Property Office of P.R. China on Jun. 28, 2016 in the examination of the Chinese Patent Application No. 201210477189.4, which corresponds to the subject case.

* cited by examiner

Primary Examiner — Sarah A Slifka
(74) Attorney, Agent, or Firm — Robert E. Bushnell, Esq.

(57) ABSTRACT

A secondary battery of the present invention includes an electrode assembly composed by a first plate and second pole plate, a separator interposed between the first pole plate and the second pole plate, and first and second electrode tabs connected to the first pole plate and the second pole plate, respectively; a battery case, in which a sealing portion is provided in an edge thereof, accommodating the electrode assembly; and an insulation member covering at least some of the sealing portion, wherein the electrode assembly is accommodated into the battery case so that the first and second electrode tabs are drawn out through the sealing portion, and the insulation member is provided to cover at least some of the portion in which the first or second electrode tabs are drawn.

8 Claims, 5 Drawing Sheets

SECONDARY BATTERY

CLAIM PRIORITY

This application makes reference to, incorporates the same herein, and claims all benefits accruing under 35 U.S.C. §119 from an application earlier filed in the Korean Intellectual Property Office on 9 Dec. 2011 and there duly assigned Ser. No. 10-2011-0132082.

BACKGROUND OF THE INVENTION

1. Field of the Invention

The present invention relates to a secondary battery, more particularly, to the secondary battery of a pouch type.

2. Description of the Related Art

Recently, the secondary battery is variously used as power sources for portable electronic devices. Further, as the portable electronic devices are used in various fields, the demand for the secondary battery is abruptly increasing. The secondary battery may be charged and discharged to use many times. As a result, the secondary battery is economically and environmentally effective, thereby encouraging its use.

As the potable electronic devices become smaller and thinner, it is required that the secondary battery mounted in the potable electronic devices become smaller and thinner, and the demand for the secondary battery is increasing.

The above information disclosed in this Related Art section is only for enhancement of understanding of the background of the invention and therefore it may contain information that does not form the prior art that is already known to a person of ordinary skill in the art.

SUMMARY OF THE INVENTION

An advantage of some aspects of the invention is that it provides a secondary battery with improved productivity by using new member.

Another advantage of some aspects of the invention is that it provides a secondary battery that reduces production costs and improves process efficiency by simplifying production processes.

According to an aspect of the invention, there is provided a secondary battery, comprising: an electrode assembly composed by first and second pole plates, a separator interposed between the first pole plate and the second pole plate, and first and second electrode tabs connected to the first pole plate and the second pole plate, respectively; a battery case, in which a sealing portion may be provided in an edge thereof, accommodating the electrode assembly; and an insulation member covering at least some of the sealing portion, wherein the electrode assembly may be accommodated into the battery case so that first and second electrode tabs are drawn out through the sealing portion, and the insulation member may be provided to cover at least some of the portion in which the first or second electrode tabs are drawn.

The insulation member includes a base provided to correspond to the sealing portion, and an electrode tap cover extended from the base and covering at least some of first or second electrode tabs.

The electrode tap cover includes the second electrode tab, and may be provided adjacent to the end of the sealing portion.

The sealing portion includes the front and the rear, and the insulating member may include the base provided to correspond to the front of the sealing portion, and at least one extension portion extended from the base and bent to cover the rear of the sealing portion.

A bent portion corresponding to the end of the sealing portion may be included in the insulating member, and the bent portion may be provided between the base and the extension portion.

Further, the extension portion includes the first and second extension portions, the first extension portion may be extended in parallel with the first and second electrode tab to cover the end of the sealing portion, and the second extension portion may be extended to be vertical to the first extension portion from the both sides of the base.

The second electrode tab includes the front and the rear, and the electrode tap cover may include a first cover provided to cover the front of the second electrode tap, and a second cover extended from the both sides of the first cover and bent to cover the rear of the second electrode tab.

At this moment, the insulation member includes the bonding layer that may be provided in the portion except the second cover.

The first and second pole plate include a positive plate and negative plate, respectively, the first and second electrode tabs include a positive and negative tab, respectively, the battery case may be sequentially formed by an internal resin layer, a metal layer and an external resin layer wherein the metal layer may be formed by the same metal as the first electrode tab.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
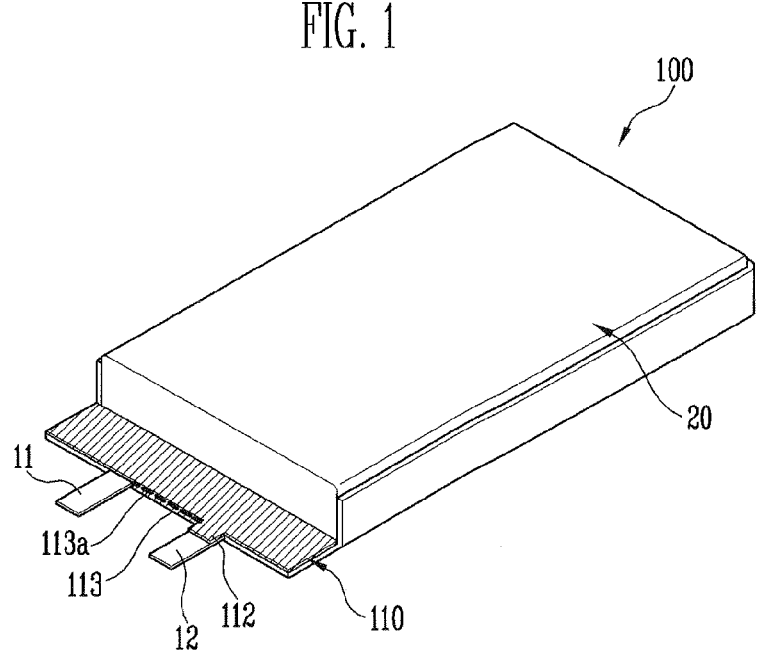
FIG. 1 is a perspective view of a secondary battery according to an exemplary embodiment of the invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. In order to clarify the present invention, elements extrinsic to the description are omitted from the details of this description, and like reference numerals refer to like elements throughout the specification.

The specifics of other embodiments are included in the detailed description and drawings.

Benefits and features of the invention and how to achieve them will be become clear with reference to exemplary embodiments to be described below in detail along with the accompanying drawings. However, the invention is not limited to exemplary embodiments disclosed below and can be implemented with a variety of different forms. When any part in the description below is connected to the other part, this means a indirect connection to dispose other device between the parts as well as a direct connection. In addition, the parts that are not related to the invention in the drawings are omitted to clarify the invention, and the same numerals are attached to similar parts throughout the specification.

Hereinafter, the invention will be described with reference to the attached drawings.

Figure 2:
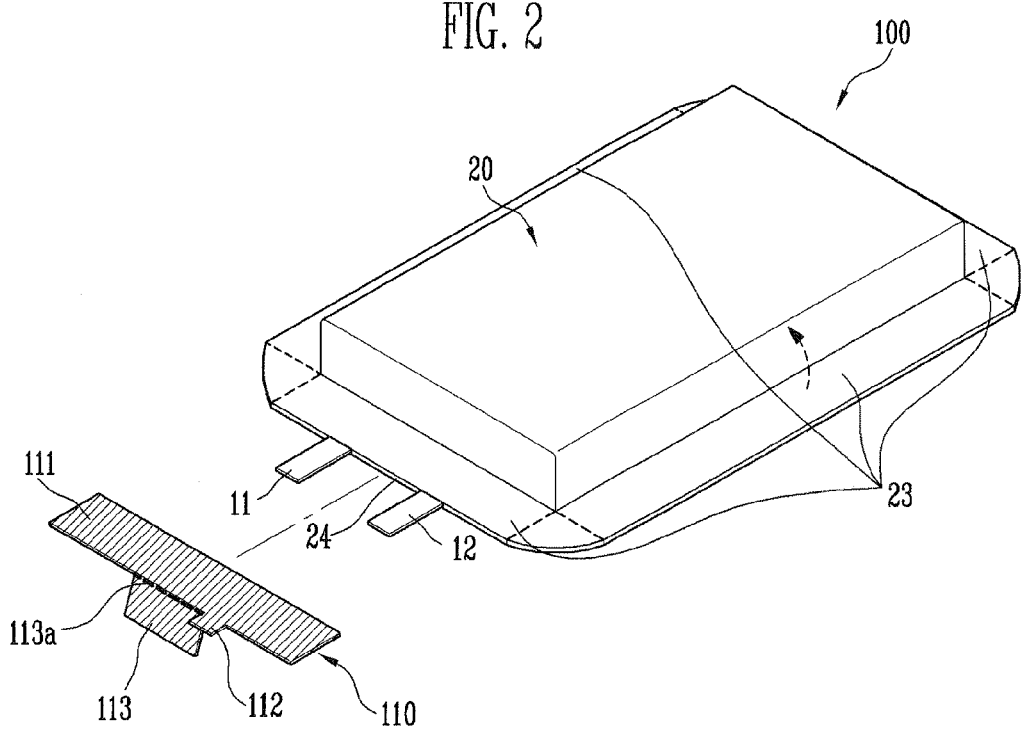
FIG. 2 is a disassembled perspective view of FIG. 1.
Figure 3:
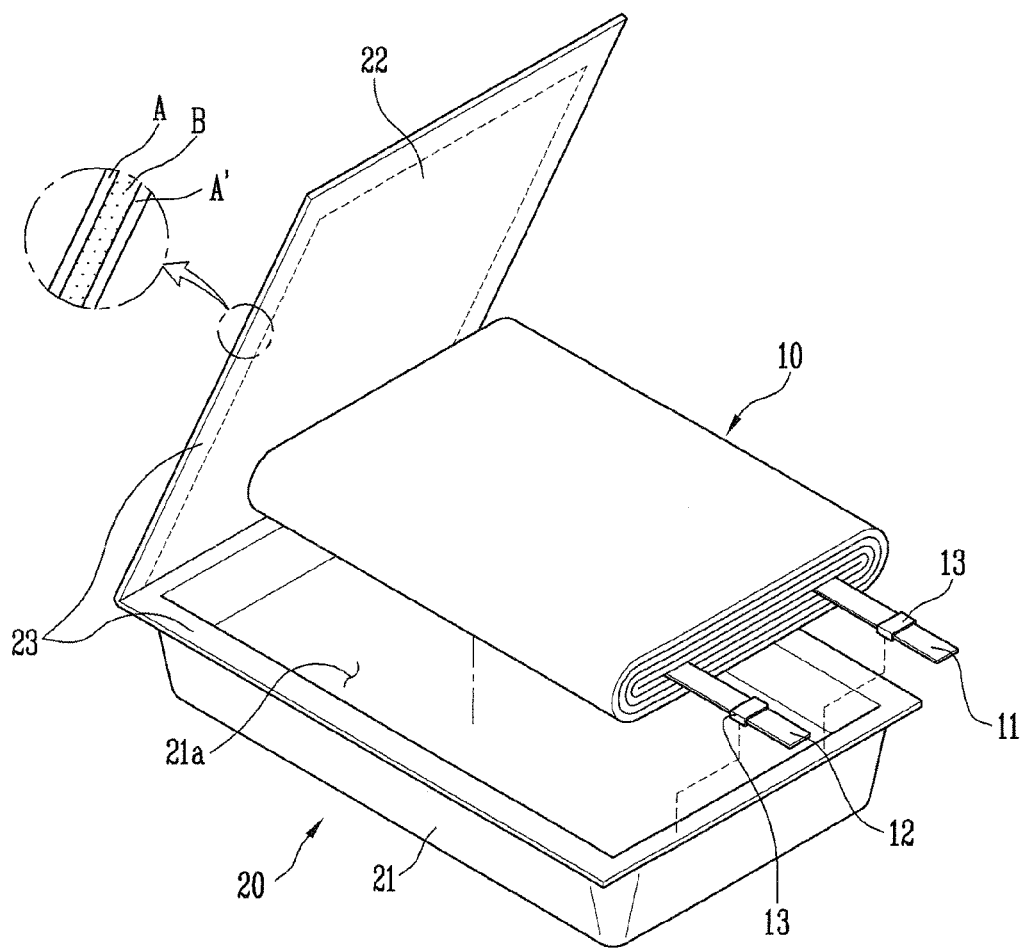
FIG. 3 schematically shows a battery case and an electrode assembly.

FIG. 1 is a perspective view of a secondary battery according to an exemplary embodiment of the invention, and FIG. 2 is a disassembled perspective view of FIG. 1. FIG. 3 schematically shows a battery case and electrode assembly.

The secondary battery 100 of an exemplary embodiment of the invention includes an electrode assembly 10 composed by first and second pole plates, a separator interposed between the first pole plate and the second pole plate, and first and second electrode tabs 11,12 connected to the first pole plate and the second pole plate, respectively; a battery case 20, in which a sealing portion 23 may be provided in an edge thereof, accommodating the electrode assembly 10; and an insulation member 110 covering at least some sealing portion 23, wherein the electrode assembly 10 may be accommodated into the battery case 20 so that first and second electrode tabs 11,12 are drawn out through the sealing portion 23, and the insulation member 110 may be provided to cover at least some of the portion in which the first or second electrode tabs 11,12 are drawn.

When ions or electrons move between the first and second pole plates, electrochemical energy is generated, and the electrochemical energy may be transferred into the outside through the first and second electrode tabs 11, 12. Each lead film 13 may be formed in the first and second electrode tab 11, 12. The electrode assembly 10 may be manufactured by various scheme winding together the first and second plates and separator or laminating them. Further, the electrode assembly 10 includes the first and second electrode tab 11, 12 to be connected to each of the first and second pole plate, and the first and second electrode tab 11, 12 are drawn from the electrode assembly 10.

The battery case 20 may include a body 21 provided with an accommodating portion 21a, and a cover 22 connected to the body 21 and covering the accommodating portion 21a. Further, edges of the body 21 and the cover 22 are heat-welded in an adhered state and form the sealing portion 23, thereby to seal the battery case 20. For example, the battery case 20 may include a pouch. The accommodating portion 21a may be provided in the body 22 by deep drawing manufacturing hollow vessels seamlessly from a plan plate. Further, the accommodating portion 21a may be provided to be corresponded to a shape of the electrode assembly 10.

For example, the first and second pole plates include a positive plate and negative plate, respectively, the first and second electrode tab 11, 12 include a positive and negative tab, respectively, the battery case 20 may be sequentially formed by an internal resin layer A', a metal layer B and an external resin layer A wherein the metal layer B may be formed by the same metal as the first electrode tab 11.

The battery case 20 may be formed by a plurality of layers including the internal resin layer A', the metal layer B and the external resin layer A. At this moment, the internal resin layer A', the metal layer B and the external resin layer A may be sequentially provided in a laminated type. The internal resin layer A' directly faces the electrode assembly 30, and the external resin layer A may be provided in the outermost surface of the battery case 20. That is, the internal resin layer A' and the external resin layer A may be formed using an electrical nonconductor, that is, polymer resin etc. to prevent electrical short etc. On the other hand, the metal layer B may be provided to provide a determined mechanical strength to the battery case 20, for example, the metal layer B contains aluminum etc.

In general, in an end of the sealing portion of the battery case, the metal layer may be exposed. Therefore, the first or the second electrode tab to be drawn through the sealing portion may be electrically short-circuited with the metal layer of the battery case to be exposed in the sealing portion. Further, in the battery case during the process manufacturing the secondary battery, the external resin layer of the surface thereof may be peeled by a sharp portion of the electrode tab or tool etc. and therefore, the metal layer may be exposed. At this moment, since the metal layer of the battery case has the same polarity as the first electrode tab, the metal layer may be electrically short-circuited with the second electrode tab having the opposite polarity.

The present invention relates to a secondary battery 100 providing a new insulation member 110 to solve above problem. The insulation member 110 covers at least some of the sealing portion 23 of the secondary battery 100 and the first or second electrode tab 11,12. Further, to prevent the short between the metal B exposed through the end 24 of the sealing portion 23 and the second electrode tab 12, the sealing portion 23 may be provided with the insulation member 110, and the insulation member 110 covers some of the second electrode tab 12 adjacently provided to the end 24 of the sealing portion 23. Further, the insulating member 110 may be provided in the portion, in which the first or second electrode tab 11,12 is drawn, of the sealing portion 23 of the battery case 20. Although it is shown that the insulating member 110 of the invention is provided in the portion, in which the first and second electrode tab 11, 12 are drawn, of the sealing portion 23, is not limited thereto. The insulation member 110 may be provided in whole or part of the sealing portion 23.

The material of the first and second electrode tabs 11, 12 may be the metal, and the metal may hinder the sealing portion 23 from heat-welding. Therefore, the lead film 33 may be provided with the portion, corresponding to the sealing portion 23, of the first and second electrode tab 11, 12, thereby to prevent sealing lowering of the sealing portion 23.

Figure 4A:
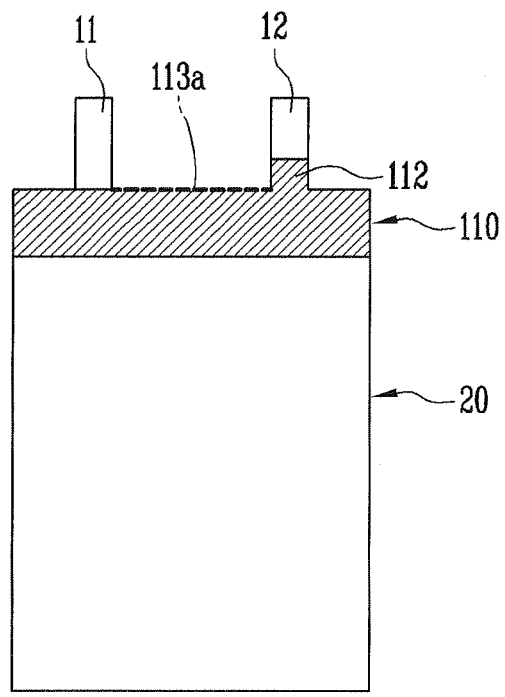
FIG. 4A is a perspective view for an insulating member of the embodiment.
Figure 4B:
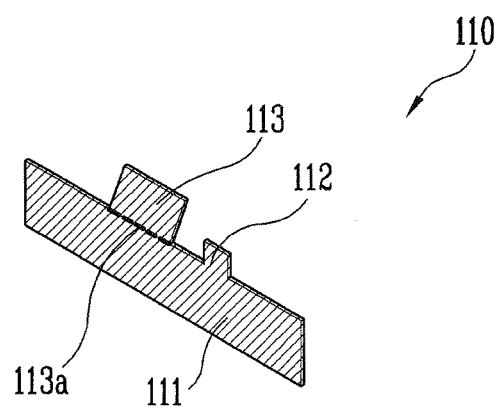
FIG. 4B is a plan view of the secondary battery of the embodiment.

FIG. 4A is a perspective view for an insulating member of the embodiment, and FIG. 4B is a plan view of the secondary battery of the embodiment.

Referring to FIGS. 4A and 4B, the insulation member 110 includes a base 111 provided to correspond to the sealing portion 23, and an electrode tap cover 112 extended from the base 111, and covering at least some of first or second electrode tab 11,12. Further, an electrode tap cover 112 may be provided adjacent to the end of the sealing portion 23 in the first or second electrode tab 11,12.

A protection circuit module controlling current and voltage may be provided in the secondary battery 100 wherein the protection circuit module minimizes the volume of the secondary battery 100 and may be provided in the sealing portion 23, in which the first and second electrode tabs 11, 12 are drawn, to be efficiently connected to the first and second electrode tabs 11, 12. At this moment, in the first and second electrode tabs 11,12, the second electrode tab 12 bent to easily connect to the protection circuit module may occur the short etc. when contacting the metal layer exposed through the sealing portion 23. On the other hand, in the secondary battery 100 of the invention, the insulation member 110 may be provided in the sealing portion 23, the electrode tab cover 112 may be provided in the insulation member 110, and the electrode tab cover 112 may insulate the portion in which the second electrode tab 12 may be bent. Therefore, when the second electrode tab 12 may be bent, the second electrode tab 12 may prevent the short with the metal layer exposed through the second electrode tab 12 and the end of the sealing portion 23.

The sealing portion 23 includes the front and the rear, and the insulating member 110 may include the base 111 provided to correspond to the front of the sealing portion 23, and at least one extension portion 113 extended from the base 111 and bent to cover the rear of the sealing portion 23. The protection circuit module may be seated in the front of the sealing portion 23, and the first and second electrode tabs 11, 12 may be bent to face the front of the sealing portion 23.

A bent portion 113*a* corresponding to the end of the sealing portion 23 may be included in the insulation member 110, and the bent portion 113*a* may be provided between the base 111 and the extension portion 113. The bent portion 113*a* may facilitate the bending of the extension portion 113, and the bent portion 113*a* contacts the end of the sealing portion 23 and therefore, may guide so that the insulation member 110 may be provided in one's regular position of the sealing portion 23. Further, the bent portion 113*a* may guide so that the electrode tap cover 112 may be also provided in one's regular position of the second electrode tab 12. That is, the bent portion 113*a* may guide the position of the insulation member 110, thereby preventing poor appearance and improving the process efficiency. Further, the insulation member 110 may further include bonding layers, and therefore, may be securely fixed to the secondary battery 100.

Hereinafter, in FIG. 5A to 6B, another embodiment of the present embodiment will be described. Except the content to be described below, description about the content similar to the content described in the embodiment related to FIGS. 1 to 4B is omitted.

Figure 5A:
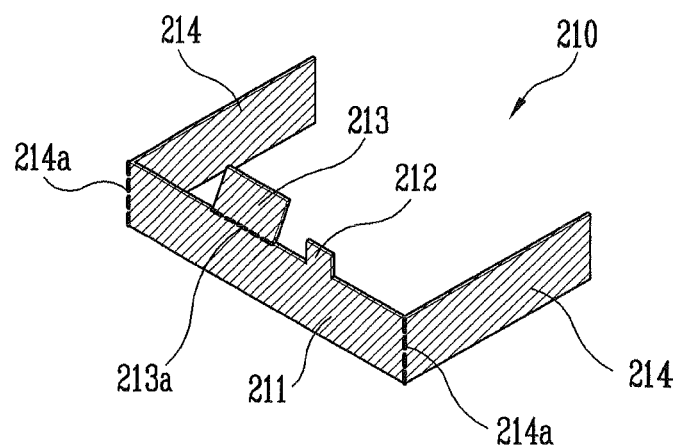
FIG. 5A is a perspective view of the insulation member according to another embodiment of the invention.
Figure 5B:
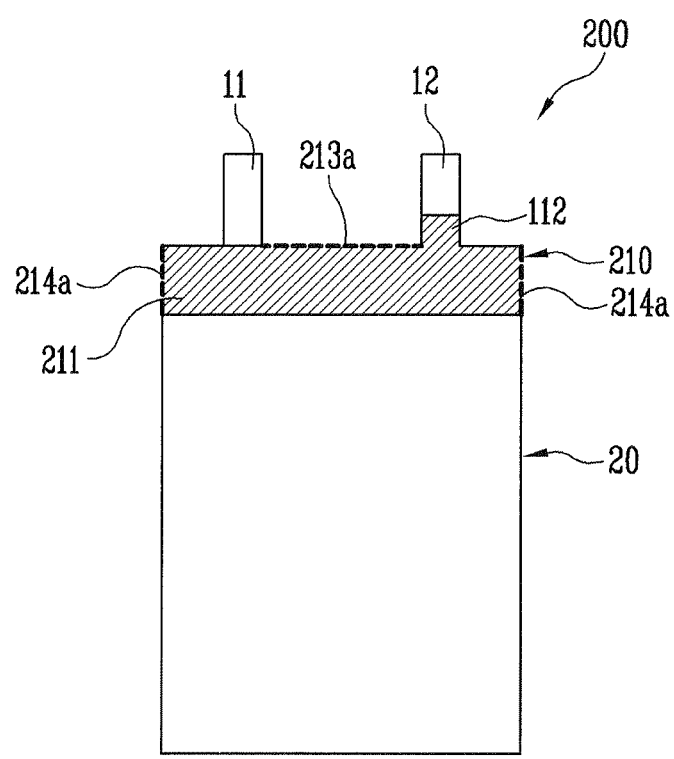
FIG. 5B is a plan view of the secondary battery according to another embodiment of the embodiment.

FIG. 5A is a perspective view for an insulating member of another embodiment of the invention, and FIG. 5B is a plan view of the secondary battery according to another embodiment of the invention.

Referring to FIGS. 5A and 5B, the secondary battery 200 of the present invention includes an insulation member 210, and the insulation member 210 may be provided in the sealing portion 23. Further, the insulation member 210 may include an electrode tap cover 212 covering at least some of the second electrode tap 12. Further, the insulation member 210 may be provided in a shape corresponding to the sealing portion 23, and may include a base 211 provided to correspond to the front of the sealing portion 23, and at least one extension portion 213, 214 extended from the base 211 and bent to cover the rear of the sealing portion 23.

The extension portion 213, 214 include a first and second extension portion 213, 214, the first extension portion 213 may be extended in parallel with the first and second electrode tabs 11, 12 to cover the end of the sealing portion 23, and the second extension portion 214 may be extended to be vertical to the first extension portion 213 from the both sides of the base 211.

Each of the first and second bent portions 213*a*, 214*a* are provided between the first and second extension portion 213, 214 and the base 211, and therefore, may guide so that the insulation member 210 may be provided in one's regular position of the sealing portion 23. Further, the second extension portion 214 may be provided to cover the rear end of the sealing portion 23. The second extension portion 214 may be extended to the rear end of the sealing portion 23, and surrounds the front and the rear of the sealing portion 23, thereby improving mechanical strength of the sealing portion 23. Further, since the sealing portion 23 may be totally insulated with the insulation member 210 only of the present embodiment only without adding separate member, the material cost of the secondary battery 200 is saved and the productivity is improved by simplifying the process.

Figure 6A:
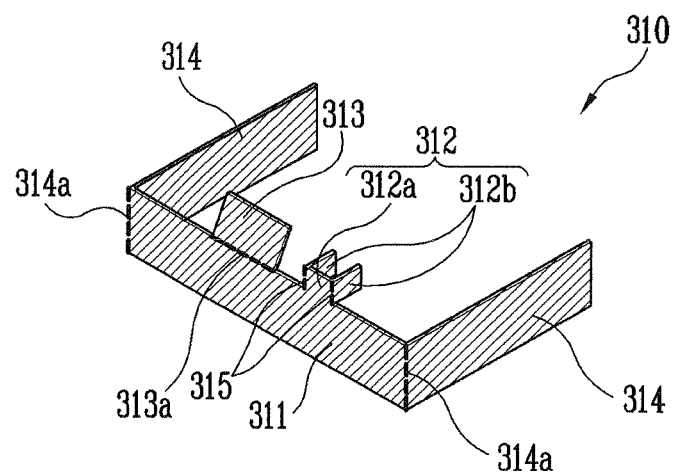
FIG. 6A is a perspective view of the insulation member according to another embodiment of the invention.
Figure 6B:
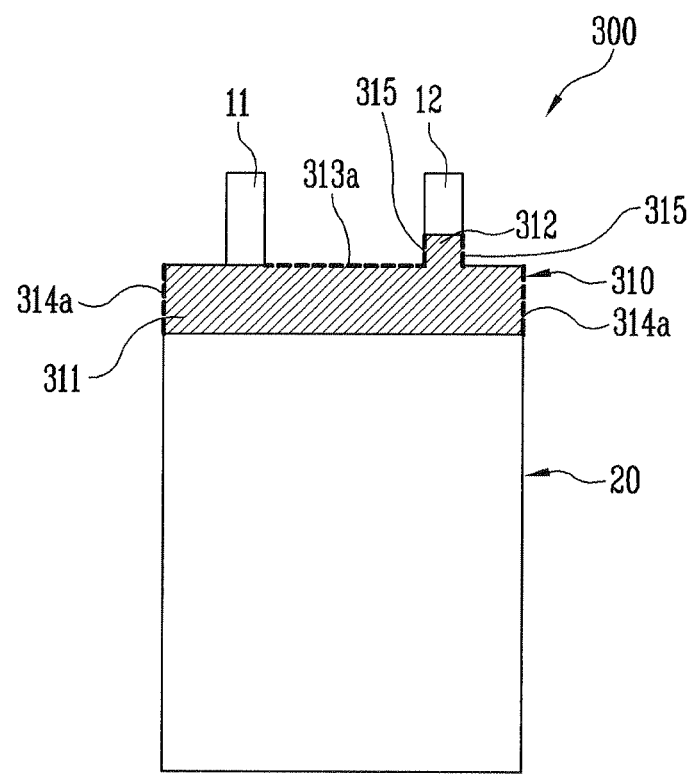
FIG. 6B is a plan view of the secondary battery according to another embodiment of the invention.

FIG. 6A is a perspective view for an insulating member of another embodiment of the invention, and FIG. 6B is a plan view of the secondary battery according to another embodiment of the invention.

Referring to FIGS. 6A and 6B, the secondary battery 300 of the present embodiment is provided in the sealing portion 23, and may include an insulation member 310 providing the electrode tap cover 312 covering at least some of the second electrode tap 12. Further, the insulation member 310 may include a base 311 provided to correspond to the front of the sealing portion 23, and at least one extension portion 313, 314 extended from the base 311 and bent to cover the rear of the sealing portion 23.

Further, the second electrode tap 12 includes the front and the rear, the electrode tap cover 312 may include a first cover 321*a* provided to cover the front of the second electrode tap 12, and a second cover 312*b* extended from the both sides of the first cover 312*a* and bent to cover the rear of the second electrode tab 12. A bent portion 315 may be provided between the first cover 312*a* and the second cover 312*b*, and may guide so that the electrode tap cover 12 may be provided in one's regular position. Further, since the second cover 312*b* may be provided to cover the rear of the second electrode tab 12, the second electrode tab 12 may be stably insulated by the electrode tap cover 312.

The insulation member 310 includes a bonding layer wherein the bonding layer may be provided in the portion except the second cover 312*b*. The insulation member 310 may be stably fixed in the secondary battery by the bonding layer. On the other hand, when the bonding layer may be provided in the second cover 312b, the thickness of the electrode tab cover 312 may be increased, thereby to hinder the bending of the second cover 312b. Further, the first cover 312a may be provided with the bonding layer, and the electrode tap cover 312 may be stably fixed in the second electrode tab 12. As a result, the insulating member 310 of the embodiment further the bonding layer, and the bonding layer may be provided in the portion except the second cover 312b, thereby to facilitate the bending of the second cover 312b.

According to an embodiment of the present invention, a secondary battery with improved productivity by using new member may be provided.

Further, According to another embodiment of the present invention, a secondary battery that reduces production costs and improves the process efficiency by simplifying the production process may be provided.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery, comprising:
an electrode assembly composed by a first pole plate and second pole plate, a separator interposed between the first pole plate and the second pole plate, and first and second electrode tabs connected to the first pole plate and the second pole plate, respectively;
a battery case, in which a sealing portion is provided in an edge thereof, accommodating the electrode assembly; and
an insulation member covering and in direct contact with at least some of the sealing portion, said insulation member having a base consisting of a rectangular prism shape with an electrode tap cover and a bent portion extending from one edge of said base, said electrode tap cover and said bent portion each consisting of a rectangular prism shape, said electrode tap cover and said base of said insulation member are entirely flat and positioned in a same geometric plane, and said bent portion is positioned between the first and second electrode tabs and has a length and width dimensions that are each less in size than a distance between the first and second electrode tabs,
wherein the electrode assembly is accommodated into the battery case so that first and second electrode tabs are drawn out through the sealing portion, and the electrode tap cover comes in direct contact with a portion of the first or second electrode tabs and not an entirety of a surface of either the first or second electrode tabs.

2. The secondary battery according to claim 1, wherein the electrode tap cover covers at least a portion of the second electrode tab, and is provided adjacent to the end of the sealing portion.

3. The secondary battery according to claim 1, wherein the sealing portion includes a front and a rear, and the insulation member with the base provided to correspond to the front of the sealing portion, and at least one extension portion extended from the base and bent to cover the rear of the sealing portion.

4. The secondary battery according to claim 3, wherein said bent portion corresponding to the end of the sealing portion in the insulating member,
wherein the bent portion is provided between the base and the extension.

5. The secondary battery according to claim 3, wherein the extension portion includes first and second extension portions, the first extension portion is extended in parallel with the first and second electrode tabs to cover the end of the sealing portion, and the second extension portion is extended to be vertical to the first extension portion from the both sides of the base.

6. The secondary battery according to claim 1, wherein the second electrode tab includes a front and a rear, and the electrode tap cover includes a first cover provided to cover the front of the second electrode tap, and a second cover extended from the both sides of the first cover and bent to cover the rear of the second electrode tab.

7. The secondary battery according to claim 6, wherein the insulation member includes a bonding layer positioned at a portion of the sealing portion except where the second cover exists.

8. The secondary battery according to claim 1, wherein the first and second pole plates include a positive plate and negative plate, respectively, the first and second electrode tab include a positive and negative tab, respectively, the battery case is sequentially formed by an internal resin layer, a metal layer and an external resin layer wherein the metal layer may be formed by the same metal as the first electrode tab.

* * * * *